Jan. 16, 1968  J. HARBIDGE  3,363,673
MEANS FOR DRIVING THE ROTOR OF A ROTARY
REGENERATIVE HEAT EXCHANGER
Filed Dec. 6, 1965  3 Sheets-Sheet 2

INVENTOR

JOHN HARBIDGE

INVENTOR
JOHN HARBIDGE

United States Patent Office 3,363,673
Patented Jan. 16, 1968

3,363,673
MEANS FOR DRIVING THE ROTOR OF A ROTARY REGENERATIVE HEAT EXCHANGER
John Harbidge, Solihull, England, assignor to The Rover Company Limited, Solihull, England
Filed Dec. 6, 1965, Ser. No. 511,948
Claims priority, application Great Britain, Dec. 5, 1964, 49,575/64
4 Claims. (Cl. 165—8)

ABSTRACT OF THE DISCLOSURE

Rotary regenerative heat exchanger in which the rotor is driven and also supported by a plurality of co-axial driving rings instead of by a shaft. Each ring engages a cylindrical surface of the rotor through one-way driving members and is supported by a pair of links driven by one of a plurality of eccentrics. The eccentrics are mounted on a rotatable shaft at different angular positions thereon, whereby on turning the shaft, the rings will be circumferentially oscillated one after another. Movement of the rings in one direction transmits torque to the rotor while the return movement does not. In this way the rotor is turned in a series of circumferential steps; but the greater the number of rings, the nearer the motion will approximate to a steady rotation. Also the supporting links absorb shock which would have been transmitted to the rotor if the latter had been supported by a shaft. This feature is of particular importance where the rotor is made of a ceramic material.

The invention relates to a rotary regenerative heat exchanger of the kind used in gas turbine engines or power plants and is particularly concerned with means for driving the rotor, i.e., the heat-storing matrix, of the heat exchanger.

In order to effect efficiently transfer of heat by the rotor, it is necessary for the latter to be rotated slowly. Where the rotor is to be driven by a turbine-driven shaft of a gas turbine engine or power plant to which the heat exchanger is fitted, it has hitherto been necessary to provide a reduction gear between the shaft and the rotor, as the shaft rotates at a very much higher speed than that required for the rotor. In automobile gas turbine engines incorporating a rotary regenerative heat exchanger, difficulty has been experienced in making the necessary reduction gear of sufficiently small bulk and weight. Another difficulty that has been experienced is the supporting of the rotor on a shaft rotatable with the rotor and located at its ends in bearings, especially in the case of a rotor made of a ceramic material, where there is the additional difficulty of preventing shock or inertia loads from being transmitted to the rotor through the supporting shaft.

An object of the invention is to provide means for driving the rotor of a rotary regenerative heat exchanger in such a way as to avoid the use of a reduction gear and the supporting of the rotor on a shaft rotatable with the rotor and supported at its ends in bearings.

According to the invention, a rotary regenerative heat exchanger includes a heat-storing matrix in the form of a rotor having a cylindrical surface and means for rotating the rotor, said means comprising a driving member arranged coaxially of said cylindrical surface, resilient one-way driving means acting between the driving member and said cylindrical surface, the one-way driving means permitting relative expansion and contraction between the rotor and the driving member, and means for rotatively oscillating the driving member, thereby to effect rotation of the rotor, said oscillating means also acting to locate the driving member, and thereby the rotor, for rotation about the common axis thereof.

Where only one driving member is employed, the rotor will be rotated intermittently in steps; but instead of a single driving member a plurality of driving members may be employed together with a corresponding number of oscillating means, each connected to a respective driving member and operable one after another. In this way the time intervals between angular movements of the rotor will be reduced and therefore the rotation of the rotor will become smoother as the number of driving members is increased. By using a sufficient number of driving members and oscillating means, the rotation can be effected substantially continuously.

By way of example, two forms of driving means for the rotor of a rotary regenerative heat exchanger in accordance with the invention will now be described with reference to the accompanying drawings, in which.

Figure 1:
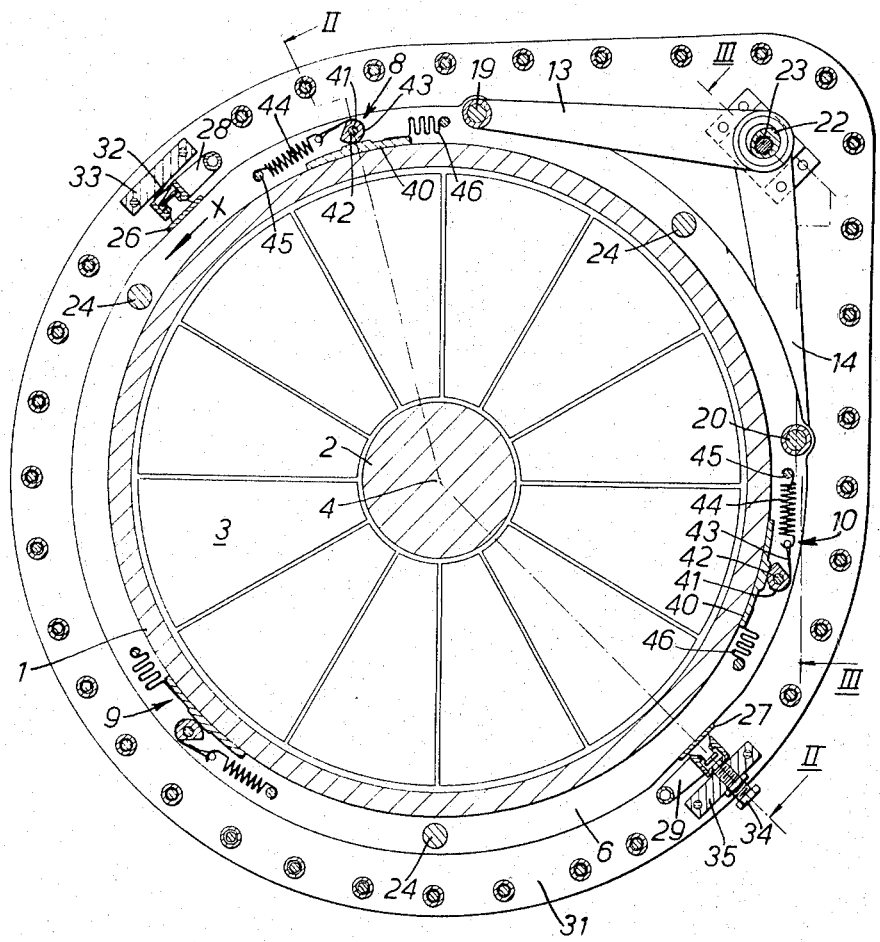
FIGURE 1 is a cross-section through a heat exchanger having the first form of driving means, the cross-section being in a plane I—I in FIGURE 2 transverse to the axis of rotation of the rotor.
Figure 2:
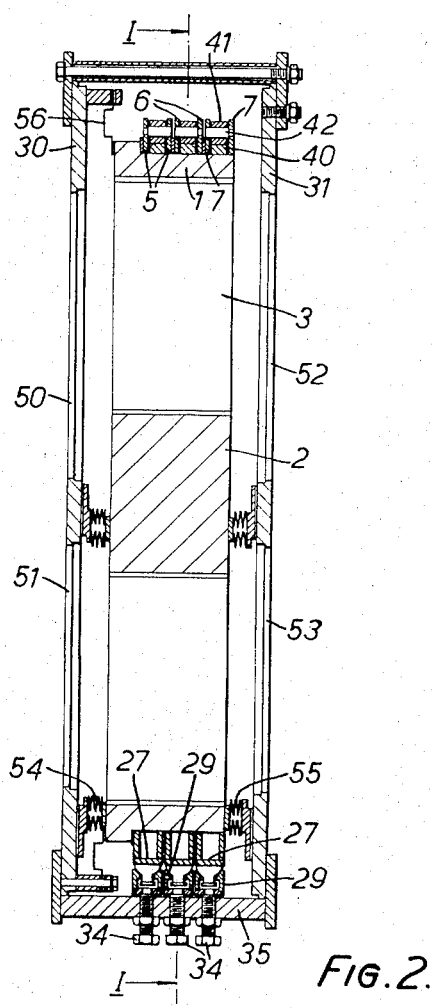
FIGURE 2 is a section through the heat exchanger on the line II—II in FIGURE 1.
Figure 3:
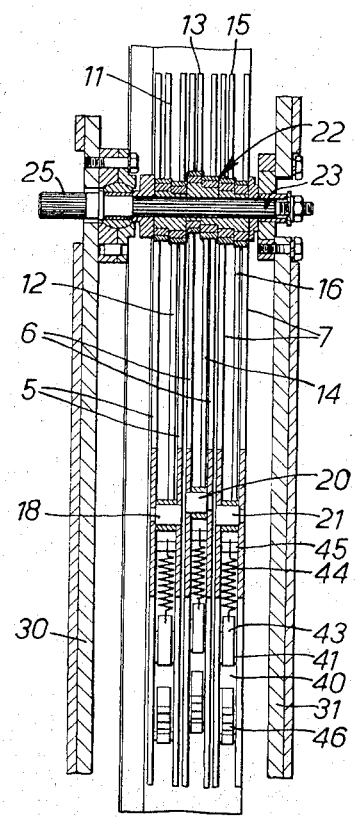
FIGURE 3 is a section on the line III—III in FIGURE 1, drawn to a larger scale.

Referring to FIGURES 1–3, the heat exchanger rotor is cylindrical and is made of a ceramic material. It has a non-porous rim 1, a non-porous hub 2 and sector-shaped porous portions 3 forming a heat-storing matrix through which flow of gas can take place in directions parallel to the axis of rotation 4 of the rotor. The invention is not concerned with the construction of the rotor and this will not be further described herein. Although the rotor is rotatable about the axis 4, it is not mounted for rotation with a shaft as in rotary regenerative heat exchangers as proposed hitherto.

The driving means for the rotor comprises a plurality of (e.g., three) pairs of axially-spaced rings 5, 6, 7 arranged side-by-side coaxially around the rotor, each ring having an internal diameter sufficiently greater than the external diameter of the rotor rim 1 to permit the pairs of rings 5, 6, 7 and the rotor to be turned relatively to each other about the common axis 4. At intervals circumferentially around the rotor and located between the rings of each pair of 5, 6, 7, there is a one-way driving means indicated generally by arrow 8, 9 or 10 (in FIGURE 1) by which the rotor is rotated in the direction of arrow X when the respective pair of driving rings is moved in that direction. The one-way driving means 8, 9 and 10 will be described hereinafter. The rings of each pair are connected to one another by pins 24 (see FIGURE 1). Each pair of driving rings 5, 6, 7 is engaged by a pair of links 11 and 12; 13 and 14; 15 and 16 respectively. The links of each pair are pivotally attached at one end thereof to circumferentially spaced pivots on the respective pair of rings 5, 6, 7. The attachment points of the links 12, 14, 16 to the respective rings are indicated at 18, 20, 21 respectively in FIGURE 3. The attachment point 20 of the link 14 is also shown in FIGURE 1. The attachment point of the link 13 to the rings 6 is shown at 19 in FIGURE 1. The links 11 and 15 are similarly attached to the respective pair of rings 5 and 7 but these attachment points do not appear in the drawings. The other ends of the links 11–16 are formed as bosses having circular holes therein and engaging respective eccentrics, indicated generally by reference 22, mounted on a common shaft 23. The eccentrics 22 are arranged at different angular positions with respect to each other so that as the shaft 23 is rotated, the pairs of rings 5, 6, 7 will be rotatively oscillated at different times. The shaft 23 has a splined end 25 whereby it is connectable to a driven shaft of the engine to which the heat exchanger is fitted and therefore rotates at a relatively high speed; but because of the arrangement of the links 11–16, the angular movement of each of driving rings 5, 6, 7 during each oscillation thereof is small, with the result that the rotor rotates at a very much lower speed than does the shaft 23. Each pair of driving rings 5, 6, 7 is supported by its links for rotation about the common axis 4 and therefore the rotor is also supported for rotation about the common axis 4.

The pairs of rings 5, 6, 7 are also located between pairs of pads 26, 27 engaging the peripheral edges of the rings at diametrically opposite positions. The pads 26 and 27 are supported on sets of arms 28 and 29 pivotally mounted between casing end plates 30, 31 positioned one at each end of the rotor.

The arms 28 bear against springs 32 engaging a plate 33 extending between the end plates 30, 31. The arms 29 bear against adjustable stops 34 in screw-threaded engagement with a plate 35 extending between the end plates 30, 31. By adjusting the respective stops 34, the pairs of rings 5, 6, 7 can be aligned and the rotor centralised in its casing.

Each one-way driving device, referred to hereinbefore by the general reference number 8, 9 or 10 comprises an arcuate pad 40 which is held by a wedging member 41 against the periphery of the rotor rim 1. The member 41 is mounted for turning about a pin 42 supported between the rings of a pair 5, 6 or 7 and is arranged to be turned in the anticlockwise direction, as shown in FIGURE 1, when moved in the direction of arrow X by the appropriate ones of links 11–17. The anticlockwise turning of the member 41 is effected by the partial unwrapping of a strap 43 from the periphery of the member 41 by a tension spring 44 attached at one end to the strap 43 and anchored at the other end at 45 to the respective pairs of rings 5–7. As the members 41 are turned in the anticlockwise direction, the respective pads 40 are urged radially into engagement with the periphery of the rotor rim 1 and drive in the direction of arrow X is transmitted from the appropriate links to the rotor. When the respective pairs of rings 5–7 are moved in opposite directions, the members 41 will be turned in the clockwise direction by the springs 44 thereby releasing the pads 40 from driving engagement with the rotor periphery and permitting the pads 40 to slide over the latter without driving the rotor. The pads 40 are located with respect to the respective rings by means of springs 46 attached between each pad and a pair of rings. The springs 46 will also accommodate relative expansion or contraction between the respective pair of driving rings 5–7 and the rotor. The resilience afforded by the springs 44 and 46 also serves to prevent any shock or inertia load applied to the pairs of driving rings 5–7 from being transmitted to the rotor.

Although three pairs of driving rings 5–7 have been shown, another number can be employed together with the corresponding number of supporting links and eccentrics. The more driving rings there are, the less jerky will be the rotational movement of the rotor.

Although the links 11–17 support the respective pairs of driving rings 5–7 and hence the rotor and locate them for rotation about the common axis 4 and also the sets of arms 28, 29 and pads 26, 27 are provided, the rotor may also be supported in parallel guides arranged at opposite axial ends of the rotor. The support by the sets of arms 28, 29 and pads 26, 27 and, if necessary, said parallel guides is particularly important where an engine with the heat exchanger is to be mounted in a vehicle, thereby to ensure that when the vehicle travels over uneven ground, the shock or inertia loads will not be transmitted to the rotor of the heat exchanger.

The end plates 30, 31 are provided with apertures 50, 51, 52, 53 through which the gases between which heat is to be exchanged are passed. Annular seals 54, 55, 56 engageing between the end plates and the ends of the rotor are also shown but are not concerned with this invention.

Figure 4:
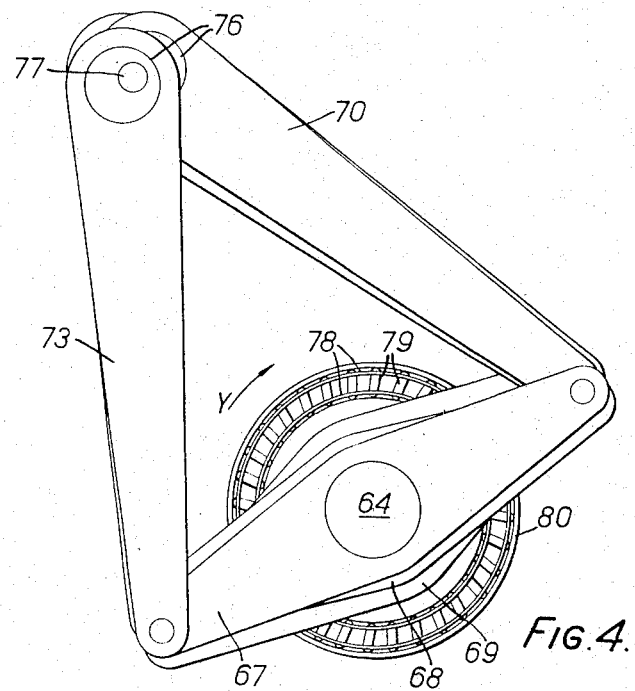
FIGURE 4 is a view in the same direction as FIGURE 1, of the second form of rotor driving means.
Figure 5:
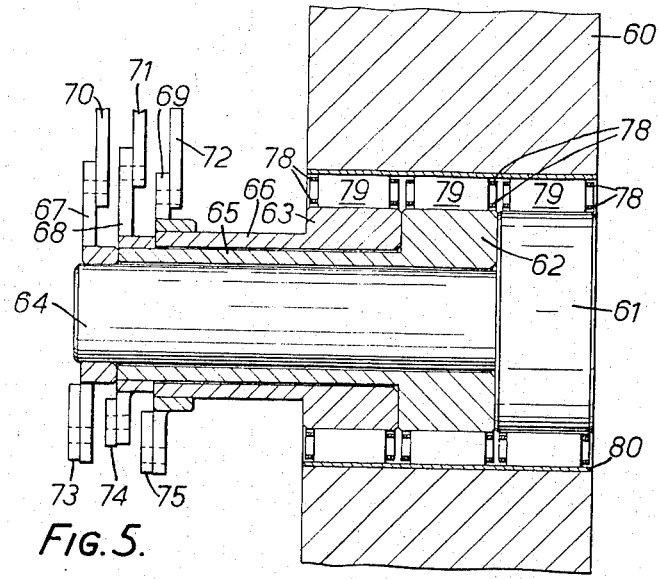
FIGURE 5 is an axial section through a hub part of the rotor and through associated parts of the driving means shown in FIGURE 4.

Referring now to FIGURES 4 and 5, the heat exchanger rotor has an axial throughway in its hub 60 (shown in FIGURE 5 only) but is otherwise similar to that shown in FIGURES 1 and 2. Instead of the pairs of driving rings 5–7 of the arrangement shown in FIGURES 1–3, there is a plurality of (e.g., three) angularly oscillatable discs 61, 62, 63 mounted side-by-side coaxially within the hub 60. The disc 61 has an integral shaft 64 extending axially of the rotor and from one end thereof. The discs 62 and 63 also have integral tubular shafts 65 and 66 respectively, forming coaxial sleeves around the shaft 64. The outer ends of the shafts 64, 65, 66 carry swingable arms 67, 68, 69 extending diametrically of the common axis of the shafts and the rotor and angularly fixed with respect to the corresponding shafts. The opposite ends of the arms 67, 68, 69 are pivotally connected by links 70, 71, 72 respectively and by links 73, 74, 75 respectively to a set of eccentrics 76, similar to the eccentrics 22 of FIGURES 1–3. The eccentrics 76 are mounted on a common driving shaft 77, similar to the driving shaft 23 of FIGURES 1–3. Concentrically around each disc 61, 62, 63 there are cages 78 carrying wedging members 79 which are biased by springs, not shown towards radial positions, whereby movement of the links 70–75 to turn the respective discs 61–63 in the direction of arrow Y will cause the members 79 to move further towards radial positions and so transmit the movement of the discs to a tubular liner 80 rotatable with the rotor hub 60. Movement of the links 70–75 to turn the respective discs 61–63 in the opposite direction will cause the members 79 to move further away from the radial positions and therefore torque in said opposite direction will not be transmitted to the rotor hub 60. In this way rotation of the shaft 77 will cause the discs 61–63 to be angularly oscillated out of phase with one another, thereby causing step-by-step rotation of the rotor in the direction of arrow Y. Similarly to the driving arrangement shown in FIGURES 1–3, more out-of-phase discs 61–63 will cause less jerky rotation of the rotor.

Any other one-way driving means between the discs 61–63 and the rotor hub 60 may be used; but it is desirable that radial resilience should be permitted, as by the members 79, to prevent shock from being transmitted by the discs to the rotor. The transmission of shock could not be avoided where the rotor is rotated by a shaft or a pair of stub shafts supported in bearings, as in rotary regenerative heat exchangers proposed hitherto.

What I claim as my invention and desire to secure by Letters Patent of the United States is:

1. A rotary regenerative heat exchanger including a heat-storing matrix in the form of a rotor having a cylindrical surface and means for rotating the rotor, wherein the improvement comprises said means including a plurality of driving members arranged coaxially of said cylindrical surface, resilient one-way driving means acting between each said driving member and said cylindrical surface, the one-way driving means permitting relative expansion and contraction between the rotor and each said driving member, and a plurality of means for rotatively oscillating said driving members independently of each other and one after another, thereby to effect rotation of the rotor, said oscillating means also acting to locate the driving members, and thereby the rotor, for rotation about the common axis thereof.

2. A heat exchanger as claimed in claim 1 in which each said driving member comprises at least one ring arranged coaxially around the rotor and engageable with the outer cylindrical surface thereof through said one-way driving means.

3. A heat exchanger as claimed in claim 1 in which said means for oscillating each said driving member comprises a pair of links each pivotally attached adjacent one end thereof to said driving member at circumferentially spaced positions thereon, an eccentric device to which each of said pair of links is pivotally attached adjacent the other end thereof and a rotatable shaft on which all said eccentric devices are mounted and by which they are driven.

4. A heat exchanger as claimed in claim 1 in which said means for oscillating said driving members comprises a plurality of pairs of links, the links of each pair each pivotally attached adjacent one end thereof to said respective driving member at circumferentially spaced positions thereon, a plurality of eccentric devices to each of which each link of said respective pair of links is pivotally attached adjacent the other end thereof and a rotatable shaft by which said eccentric devices are driven, said eccentric devices being arranged at different angular positions on said shaft, whereby they are operated one after another on rotation of said shaft.

References Cited
UNITED STATES PATENTS

| | | | |
|---|---|---|---|
| 1,426,035 | 8/1922 | Branstrator | 74—162 X |
| 2,518,177 | 8/1950 | Pulsford | 74—162 X |
| 2,953,901 | 9/1960 | Chute | 74—118 X |
| 3,167,115 | 1/1965 | Chute | 165—7 |
| 3,301,317 | 1/1967 | Weaving et al. | 165—8 |
| 3,311,204 | 3/1967 | Barnard | 165—8 X |

FOREIGN PATENTS 975,776   11/1964   Great Britain.

ROBERT A. O'LEARY, *Primary Examiner.*

A. W. DAVIS, *Assistant Examiner.*